J. J. Greenough,
Pegging Machine,
No. 703, Reissued Apr. 26, 1859.
Fig: 1
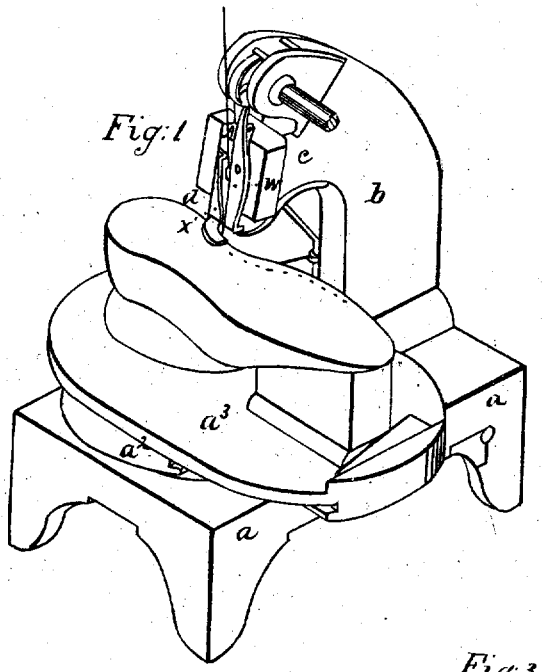
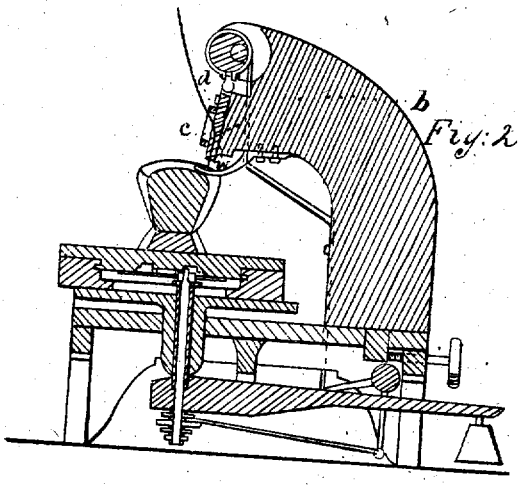
Fig: 2
Fig: 4
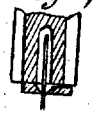
Fig: 3
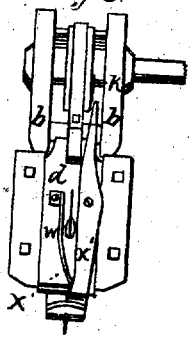
bis Fig: 2 Enlarged
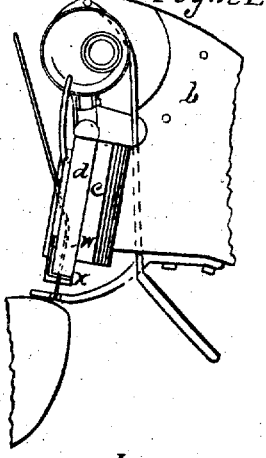
Witnesses,
Jas: H. Fraser
J. Smith
Inventor
J. J. Greenough

UNITED STATES PATENT OFFICE.

JOHN JAMES GREENOUGH, OF NEW YORK, N. Y.

IMPROVEMENT IN MACHINES FOR PEGG BOOTS AND SHOES.

Specification forming part of Letters Patent No. 10,427, dated January 17, 1854; Reissue No. 269, dated July 4, 1854; Reissue No. 703, dated April 26, 1859.

*To all whom it may concern:*

Be it known that I, JOHN JAMES GREENOUGH, of the city, county, and State of New York, have obtained Letters Patent of the United States, dated the 17th day of January, 1854, for several inventions in shoe-pegging machinery, which I now desire to separate and to have reissued to me in several distinct patents; and I do hereby declare and ascertain one of my said inventions contained in said Letters Patent, referring to the accompanying drawings, in which—

Figure 1 is a perspective view of the machine; Fig. 2, a vertical section; Fig. 2″, enlarged section; Fig. 3, front view; Fig. 4, cutters.

My improvement, which I hereby desire to secure, is for the purpose of fastening the soles of boots and shoes with wire nails or pegs of metal cut from a coil of drawn wire; and it consists of a mode of forming and driving them, combined with any convenient way of holding the boot or shoe, and moving it in the same direction that the line of pegs is driven.

In Fig. 1, *a a* is the frame; *b*, the pegging-standard; *c*, the arm of the standard that holds the slide in which the pegging apparatus plays; $a^2$ $a^3$, parts for holding the boot or shoe.

All the above-named parts may be formed in any convenient known way proper for the purpose.

For forming and driving the pegs I use a wire drawn to the figure the cross-section of the peg is to be. The end of the wire, after passing an ordinary straightening apparatus, that may also be used to hold it from rising, I convey down through a hole in a sliding gate at *w*, in which there is a pair of cutting nippers, *x*, attached to the gate. One jaw, *x*, of these nippers is movable, and its shank extends up to the eccentric or cam that moves the gate up and down. The pivot on which this jaw vibrates and the upper end of the shank are forced outward to close the jaws of the cutting-nippers by a cam, *k*, or other suitable attachment, turning with the driving-shaft, or situated at some other convenient point to produce the proper action.

The operation of this apparatus is as follows: The gate *d* being drawn up to its utmost height, the wire is held by the wire-straightener or nippers attached to the frame so as not to rise with it, while the jaws of the cutter slide over the lower end of the wire until it projects far enough below their lower edge for the due length of a nail or peg, when the the cam *k* or other device strikes the shank of the cutting-nippers, causing them to seize the wire and cut into it sufficiently to take a firm hold of it without cutting off or materially weakening it. The gate then descends with a rapid movement, carrying the wire down and driving it into the sole or other article below, in which there may or may not have been a hole made to receive it. When the wire peg is driven home, the cutters are forced a little closer together, and the wire is entirely cut off.

The form of the cutters is designed to sharpen or point the end of the wire that is to be driven in at the next operation, making a chisel form point, so as to enter the leather or other material readily. The cutters then reopen by a spring or other device, and rise above the end of the wire far enough to seize it again for making the next peg.

It is obvious that the precise mechanism here described may have other devices substituted for it - such, for instance, as cutting off the peg or wire and then driving it through a tube with a punch—but I believe this to be the simplest device for the purpose and of easy construction.

Having thus fully described my improvement in the pegging of soles of boots and shoes with metal, what I claim therein, and desire to secure by Letters Patent, is—

1. The pegging of boots and shoes with nails or pegs of drawn wire, substantially as above specified.

2. Driving the pegs by means of the cutting nippers, said nippers cutting off the peg after it is driven, substantially as specified.

J. J. GREENOUGH.

Witnesses:

JAS. W. FRASER,
SYLVESTER LAY.